United States Patent [19]

Matsumiya

[11] Patent Number: 5,204,157

[45] Date of Patent: * Apr. 20, 1993

[54] CARRIER AND METHOD

[75] Inventor: James Matsumiya, Bucks, England

[73] Assignee: Schlegel (UK) Holding Limited, Seacroft, United Kingdom

[*] Notice: The portion of the term of this patent subsequent to Dec. 17, 2008 has been disclaimed.

[21] Appl. No.: 511,076

[22] Filed: Apr. 19, 1990

[30] Foreign Application Priority Data

Apr. 21, 1989 [GB] United Kingdom ............... 8909076
Jan. 29, 1990 [GB] United Kingdom ............... 9001998

[51] Int. Cl.⁵ ............................................. B32B 5/12
[52] U.S. Cl. ................................... 428/105; 428/109; 428/122; 428/136; 428/138; 428/358; 49/490; 49/491; 49/506; 49/440; 49/441; 139/416; 139/DIG. 1
[58] Field of Search ............... 428/105, 109, 136, 138, 428/122, 358, 107, 108, 112, 255, 256; 49/490, 491, 506, 440, 441; 52/716; 139/416, DIG. 1; 66/192, 196

[56] References Cited

U.S. PATENT DOCUMENTS

| | | |
|---|---|---|
| 3,198,689 | 8/1965 | Lansing . |
| 3,236,241 | 2/1966 | Alexander ............................ 66/192 |
| 3,239,987 | 3/1966 | Lansing . |
| 3,430,387 | 3/1969 | Chapham . |
| 3,685,231 | 8/1972 | Blose . |
| 3,706,628 | 12/1972 | Azzola ................................ 428/358 |
| 3,949,530 | 4/1976 | Williams et al. . |
| 4,099,765 | 7/1978 | Bright ................................. 428/122 |
| 4,148,961 | 4/1979 | Paulus ................................ 428/358 |
| 4,624,093 | 11/1986 | Gibson ................................ 428/122 |
| 4,656,086 | 4/1987 | Bowers ............................... 428/122 |
| 4,749,203 | 6/1988 | Bright ................................. 428/122 |
| 4,892,772 | 1/1990 | Su ...................................... 428/105 |
| 5,072,567 | 12/1991 | Cook .................................. 428/122 |

FOREIGN PATENT DOCUMENTS

| | | |
|---|---|---|
| 0045176 | 2/1982 | European Pat. Off. . |
| 0155811 | 9/1985 | European Pat. Off. . |
| 0008041 | 1/1988 | Japan ................................. 428/34.1 |
| 0964605 | 7/1964 | United Kingdom . |
| 1407412 | 9/1975 | United Kingdom . |
| 1467412 | 3/1977 | United Kingdom . |
| 1545511 | 5/1979 | United Kingdom . |

Primary Examiner—Ellis P. Robinson
Assistant Examiner—Nasser Ahmad
Attorney, Agent, or Firm—Cumpston & Shaw

[57] ABSTRACT

An elongate carrier for use in the manufacture of extruded and other products comprising a plurality of longitudinally spaced transversely extending members (3 or 31) and means (9,11,13 or 83,85,87,89,90) extending lengthwise of the carrier to control the spacing of said members, wherein the transverse location in said carrier of said means (9,11,13 or 83,85,87,89,90) is varied along the length of said carrier. In one embodiment the carrier may be formed of zig-zag wire the longitudinal extension of which is controlled by textile or other warps extending lengthwise of the carrier but whose transverse location is varied, and in another embodiment of the invention, the carrier may be slotted or stamped metal or plastics, the location of the slots or slits in the stamped material being varied transversely. The invention also extends to a method of manufacturing the carrier.

39 Claims, 6 Drawing Sheets

CARRIER AND METHOD

This invention relates to carriers which are used, inter alia, as a reinforcement in rubber and plastics extrusions used in the motor and building industries, and also as a support frame for elongate textile material edge trims in the motor industry. Typical examples of wire carrier can be seen in patent specification Nos.: U.S. Pat. No. 3,949,530, U.S. Pat. No. 3,685,231, GB-A-1545511, U.S. Pat. No. 3,239,987, U.S. Pat. No. 3,198,689, GB-A-1407412 and U.S. Pat. No. 3,430,387. The invention is, however, applicable to other types of carrier, e.g. of slotted metal.

BACKGROUND OF THE INVENTION

In most, if not all, known wire carriers, the carrier is comprised of a continuous length of stiff metal wire bent to and fro into a zig-zag formation, with looped wire edge regions and transverse lengths of wire in a central region of the carrier joining the wire loops in the edge regions. The transverse lengths of wire may be straight or curved, the curved variety being either banana shaped or propeller shaped, or a combination of straight and/or banana shape and/or propeller shape. The zig-zag wires are stayed and maintained in their spaced relation with each other by a plurality of strands of material extending lengthwise of the carrier, parallel to its edge, and connected to each transverse length of wire and/or the loops by knitting the strands into the zig-zag wire, so as to provide a stitch, or knot at each crossing point. The end product is known as a knitted wire carrier and is clearly illustrated in GB-A-1407412 or U.S. Pat. No. 3,198,689. The lengthwise strands are important to prevent stretching and shrinking of the product in which the carrier is to be used.

The knitted wire carriers disclosed in the above mentioned specifications have lengthwise strands formed of textile material, such a polyester, cotton or the like, or even light wire, and traditionally have been used for many years in the manufacture, inter alia, of edge trim or combination edge trim door (or boot) seals for motor vehicles. These are formed by extruding a polymer material onto the wire by passing the latter through an extruder, and then forming the resultant product into a generally U-shape (although in some instances the knitted wire carrier can be pre-formed into a U-shape and passed through an extruder with a generally U-shaped die).

Door seals on motor vehicles have traditionally been held in place in the door openings (or on the door) by gripping onto the manufacturer's metal flanges around the door openings (or door), although other systems are now being developed. With the ever increasing complexity in motor vehicle manufacture, and in particular, the ever increasing customer requirement for efficient, good looking door seals in motor vehicles, it is important the door seals fit correctly and do not fall off or become displaced. If they do become displaced even by a small amount, they will look unsightly, will affect door shut pressures, and will also not form a satisfactory air/water seal between the door and door opening.

Modern motor vehicles tend to be manufactured with a distinct waistline (belt line) half way up the body, at approximately door lock height, and this results in two changes of direction in the flange to which the edge trim/door seal is to be fitted. Furthermore, with the advent of small motor vehicles, the sealing strip is required to negotiate sharp inside and outside bends, as well as lateral bends at the waistline, and yet still maintain its correct location on the flange, in spite of regular opening and shutting of the door. Although the whole purpose of knitted wire carriers in extruded edge trims is to stiffen the polymeric material of the extrusion, there is nevertheless now a requirement for local flexibility and variable stiffness in the carrier so that the edge trim can negotiate the various bends satisfactorily. It must also be borne in mind that when the edge trim is bent, especially if it has a door seal attached or integral therewith, then the polymeric material may deform, or wrinkle or buckle, as a result of stretching, twisting or compression, thus resulting in an ugly appearance. To a large extent, these deficiencies can be minimised or avoided by designing the stiffness of the knitted wire carrier accordingly, e.g. by making selected regions of the carrier stiffer than others, either along the length of the carrier, or across its width.

Various attempts to vary the stiffness of wire carriers have been proposed, and these proposals have met with different levels of success. For example, in EP-B-0155811, a knitted wire carrier is disclosed wherein at least two different zig-zag wires are incorporated in the carrier. In another construction disclosed in EP-B-0045176, two different types of textile material are used for the knitted longitudinal strands, one of the materials being degradable so that when a controlled amount of heat, or radiation, or other means is applied to the edge trim or the like in which the knitted carrier is located, the one material can be degraded so that it will no longer inhibit relative movement of the transverse lengths of wire in the carrier, and will thus cause a change in the stiffness of that region of the carrier.

The above-mentioned attempts to vary the stiffness of the carrier suffer from one disadvantage, namely that it is difficult to vary the carrier stiffness or flexibility across the width of the carrier, because throughout its length, the carrier is formed of uniform construction.

The present invention seeks to overcome this disadvantage. While it is specifically concerned with knitted wire carriers, it could be incorporated in non-knitted, e.g. woven wire carriers, or in what are known as slotted metal carriers, i.e. ones not made of wire, but of stamped, pressed, or formed metal, or in carriers of other material.

In GB-A-964605, various constructions of slotted metal carrier are disclosed, which are designed so that door seals or trims in which they are incorporated can negotiate sharp bends without unsightly distortion of the trim, and without any impairment of the gripping action which is effected by the carrier. In some of the constructions of carrier disclosed, the spaced transverse members of the slotted metal carrier are connected by means, i.e. bridging ribbons, the transverse position of which vary uniformly throughout the length of the carrier. In each of these different constructions, the carrier will itself have, and provide the trim with, uniform characteristics throughout its length. This means that the trim may be ideal for negotiating, for example, internal bends on a flange defining a door opening, but not suitable for negotiating bends extending in several different planes, and perhaps also internal and external (i.e. convex and concave) bends.

SUMMARY OF THE INVENTION

According to the broadest aspect of the present invention, we provide a carrier for use in the manufacture of extruded and other products, comprising an elongate device made up of a plurality of longitudinally spaced or separated transversely extending members, and means extending lengthwise of the carrier to control the spacing of said members, the transverse location in the carrier of said means being varied along the length of the carrier, the variation of the transverse location and the actual transverse location at any longitudinal position in the carrier of said means being dependent upon the required characteristics of the carrier. This means that the carrier or, as is usually the case, an extrusion in which it is located, can be designed so that it can be bent and/or twisted and/or stretched as required.

The members may comprise strips of metal or other material, and at least selected ones of said members may be connected by further strips of material integral therewith. The members may be formed of wire.

Said means may comprise at least one strand of material.

Preferably, said means comprise a plurality of strands, and some of said strands may extend in a straight line along the length of the carrier and others may be so located that their transverse location varies along the length of the carrier. Preferably, the or each strand is connected to each member, e.g. by stitching, knitting or in any other manner.

According to a preferred aspect of the present invention, we provide a wire carrier comprising at least one length of wire deformed into a zig-zag configuration and having a plurality of spaced transverse lengths of wire extending across a central region of the carrier and joined by loops of wire along each edge region of the carrier, and wherein the length of wire is stayed in its zig-zag configuration by at least one strand or strip of material, wherein the transverse location of said at least one strand of material is varied along the length of the carrier, so as to give the carrier different characteristics at different longitudinal locations as required.

Preferably, the carrier is a knitted wire carrier and the strand is connected to each transverse length of wire by a knitted stitch. Preferably, a plurality of strands extend along the length of the carrier and each is knitted into the zig-zag configuration and connected to each transverse length of wire.

The transverse location of selected ones only, or all of said strands may be varied along the length of the carrier.

Said at least one strand may be formed of degradable material, e.g. it may be degradable to the extent that its tensile strength or stiffness or any other property thereof may be varied by means of heat, chemical means, electrical means, mechanical means, radiation, or in any other way.

Preferably, selected ones of the plurality of strands are degradable. For example, groups of strands may be degradable, and groups of strands may be non-degradable, or degradable to a different extent.

In one construction, the or each degradable strand may extend in a straight line along the length of the carrier and the or each non-degradable strand may have its transverse location varied along the length of the carrier, or vice versa. Alternatively, both the or each degradable strand and the or each non-degradable strand may have its transverse location varied along the length of the carrier.

Also according to the present invention, we provide a carrier of stamped or slotted metal or other material comprising a plurality of longitudinally spaced transversely extending strips of material connected along the length of the carrier by the material of the device, e.g. by longitudinally extending strips of material, wherein the transverse location of the connecting material, e.g. the longitudinally extending strips, varies along the length of the carrier. The width of the strips may vary. The longitudinally extending strips may be inclined to the longitudinal axis of the carrier.

Also according to the present invention, we provide a carrier in the form of a longitudinally extending strip formed of metal or other sheet material, wherein a plurality of transverse, longitudinally spaced slits are provided in the strip and wherein the length of said slits varies along the length of said strip. In every case, the variation in the transverse location is designed to provide the necessary characteristics within the carrier at different locations along its length.

The slits may be located in a central region only of the strip, and/or may extend inwardly from one or both longitudinal edges of the strip.

The slits may be sufficiently wide that they form slots. Also, they may extend right across the carrier in selected regions.

Preferably, a plurality of slits of the same length are located in the strip adjacent to each other.

The slits may be inclined to the longitudinal axis of the carrier.

A strip or plurality of strips of tape may be used to connect the transversely extending members. Parts of the tape(s) may be removed to change the characteristics of the carrier.

Also according to the present invention, we provide a method of manufacturing a carrier having a plurality of longitudinally spaced transversely extending members, the longitudinal spacing of which is controlled by means extending at least generally longitudinally between, and connected to, adjacent transversely extending members, the transverse location of which means varies along the length of the carrier, characterised in that the transverse location of said means, and the variation of said transverse location throughout the length of the carrier, are selected to control the characteristics of the carrier, and hence of any product within which it is incorporated, at selected longitudinal locations therein.

BRIEF DESCRIPTION OF DRAWINGS

Nine embodiments of carrier according to the invention are now described, by way of example only, with reference to the accompanying schematic drawings, in which.

DETAILED DESCRIPTION

Figure 1:
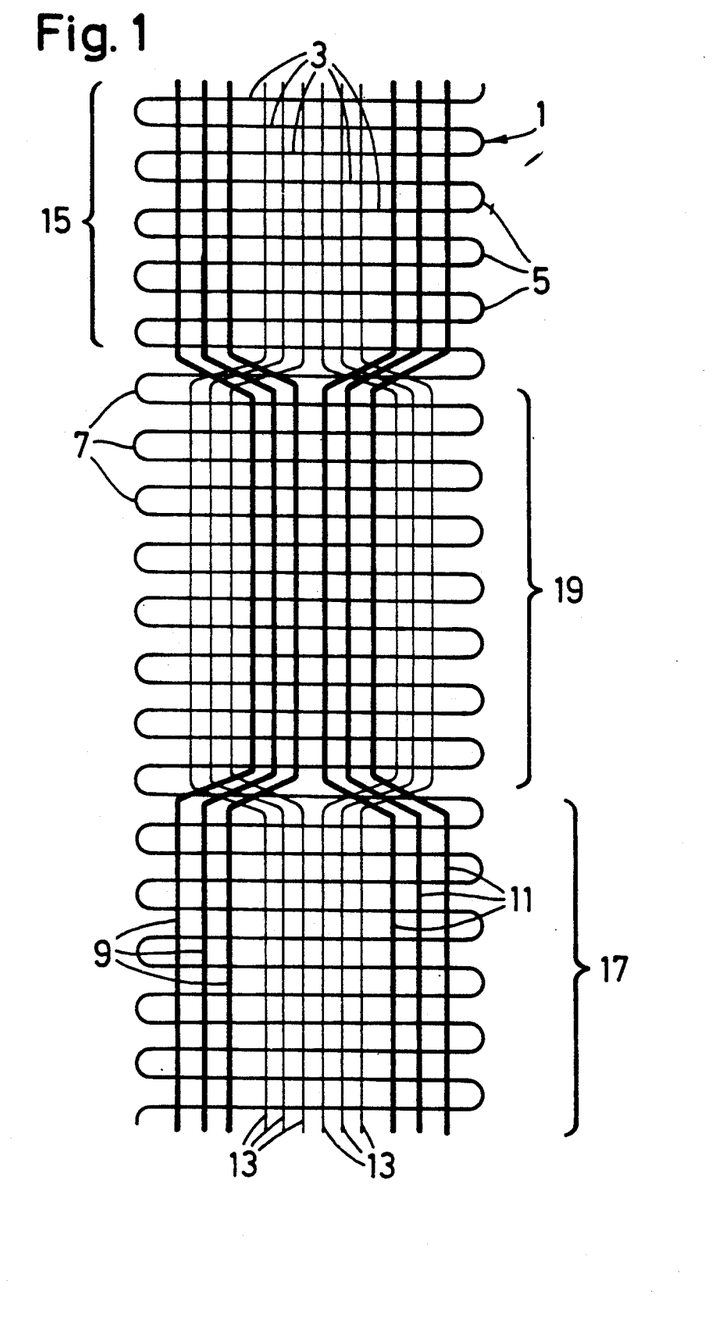
FIG. 1 is a plan view of a short length of wire carrier according to a first embodiment.

Referring to FIG. 1, the knitted wire carrier shown therein is formed of a single piece of wire 1 but bent into a zig-zag configuration, and having a plurality of longitudinally spaced transverse lengths 3 of wire extending across a central region of the carrier, and joined at their ends by generally U-shaped loops 5 of wire along one edge of the carrier and further such loops 7 along the opposite edge of the carrier. The edges of the carrier are shown as being parallel, but this is not essential. The transverse wire lengths 3 are shown as being almost straight and almost parallel. They may be completely straight, but need not be parallel, e.g. they could converge or diverge. Furthermore, they may be curved, or partly curved, and could define banana shapes or propeller shapes in the carrier.

The zig-zag wire made up of the length 3 and loops 5, 7 is maintained or stayed in its desired configuration by a plurality of strands 9, 11 and 13 of material extending lengthwise of the carrier. Because the carrier is a knitted carrier, each strand 9, 11, 13 is placed in position with a knitting machine, largely in known manner, and where it crosses a length 3 of wire, it is connected by a knitted stitch or knot to the wire.

As shown, the strands 9 and are formed of degradable material, and the strands 13 of non-degradable material.

In a first longitudinal region 15, and a second region 17, of the carrier, the degradable strands 9 and 11 are located adjacent the edge regions of the carrier and in a third region 19, nearer the centre of the carrier, whereas the locations of the non-degradable strands are near the centre of the carrier in the regions 15 and 17, but near the edge regions in the region 19. If desired, the locations of the different strands could be swapped over.

Figure 2:
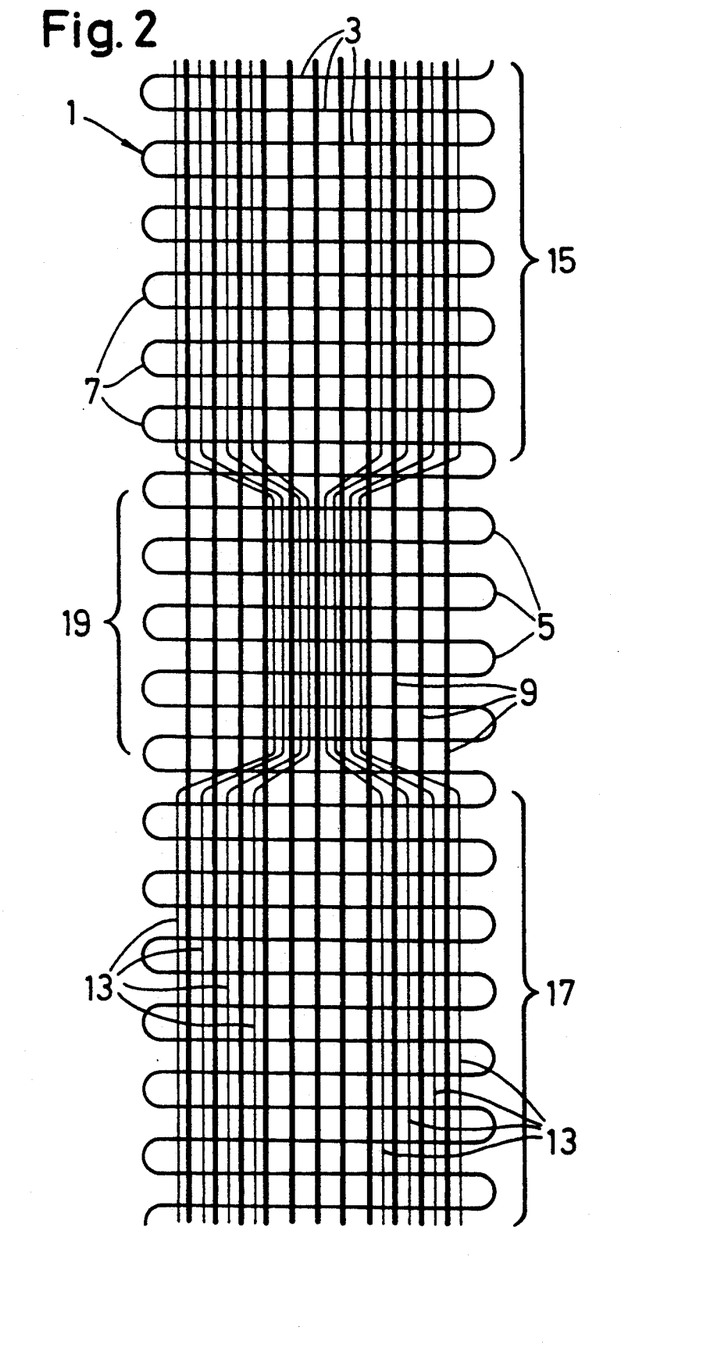
FIG. 2 is a view similar to FIG. 1 of a second embodiment of wire carrier.

In the FIG. 2 embodiment, degradable strands 9 extend parallel throughout the length of the carrier, and across its whole width (but need not) and non-degradable strands 13 are located in each of the edge regions of the carrier in the regions 15 and 17, but near the centre of the carrier in the region 19. Obviously, these locations could be swapped over.

Figure 3:
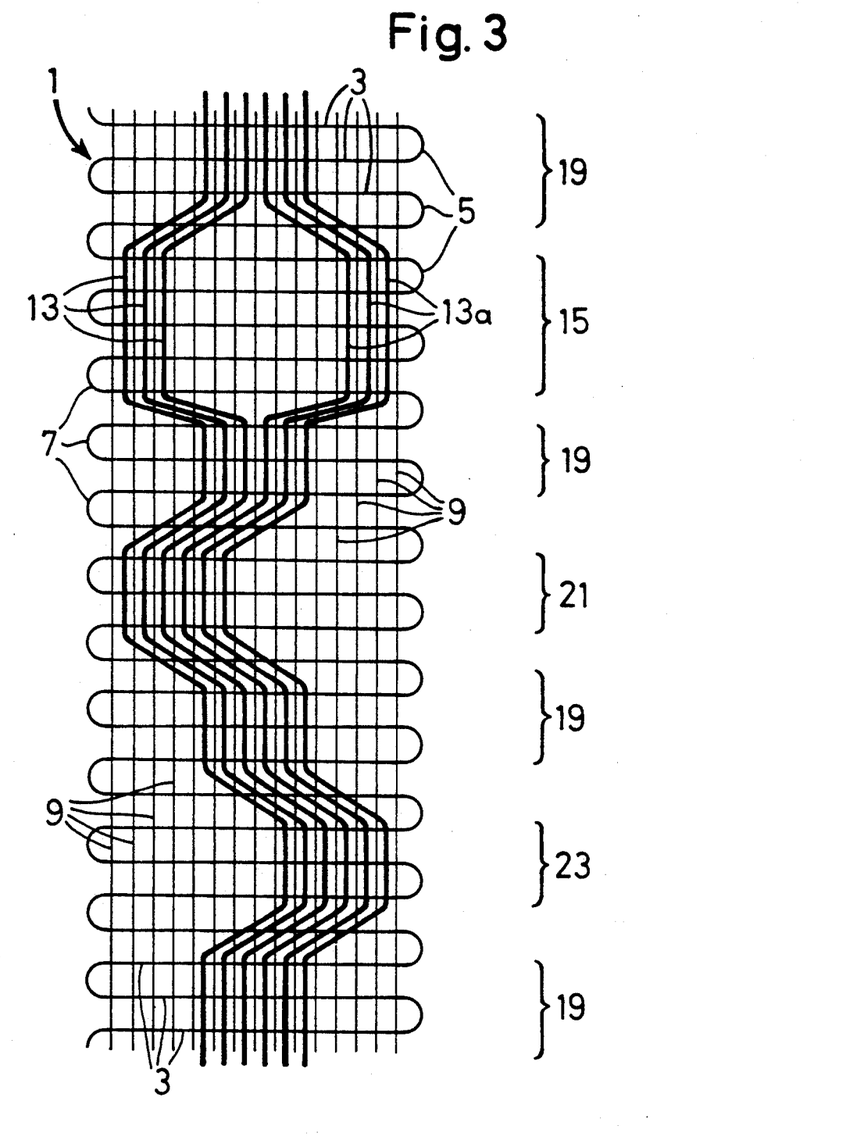
FIG. 3 is a view similar to FIG. 1 of a third embodiment of wire carrier.

In the embodiment of FIG. 3, a more complicated construction is provided, in which degradable strands 9 extend in parallel spaced straight lines throughout the length, and across the whole width of the carrier (although they need not). Two sets 13 and 13a of non-degradable strands are provided, and in the regions 19 of the carrier, these are located centrally of the carrier. However, in the region 15, they are located along opposite edge regions of the carrier, whereas in a region 21 they are all located along one edge region, and in a region 23, they are all located along an opposite edge region.

Figure 4:
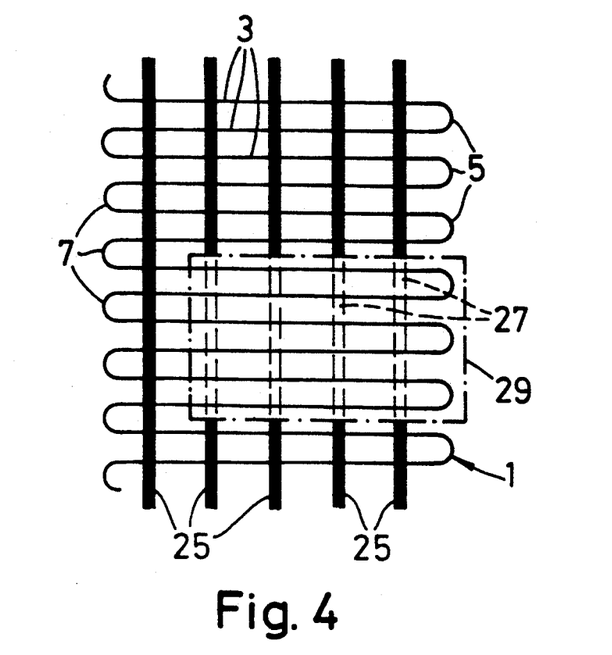
FIG. 4 is a view similar to FIG. 1 of a fourth embodiment of carrier.

In a modified construction, shown in FIG. 4, a single broad tape (not shown) or a plurality of adjacent tapes 25, which may simply abut at their edges, or be spaced apart as shown, or overlap (and if more than one is provided, they may be formed of different materials) extend lengthwise of the carrier, and across the whole or part of its width. The or each tape 25 may be formed of extruded synthetic resinous material, or be woven, and may be attached to the zig-zag wire warps, or to the slotted or stamped metal (or plastics) transversely extending carrier members by stitching, welding, adhesive, or in any other way. In order to impart different degress of flexibility to the carrier, ports of at least some of the tape(s) shown in dotted lines 27 are cut or stamped out, or otherwise removed, or in the case of several individual tapes 25, lengths of at least some of the tapes are removed or omitted. Alternatively, parts of the tape(s) could be degraded either before the carrier is incorporated into an end product, such as an extrusion, or afterwards. Such degradation can be applied using heat, chemical or mechanical means, ultrasonics, or in any other way in the area shown at 29 in FIG. 4. It is envisaged, for example, that after incorporation of the tape(s) into an extruded edge trim, selected areas 29 of the tape within the edge trim where total flexibility is required could be degraded using heat or ultrasonics across the whole width of the tape. However, if it was known beforehand exactly which areas of the extrusion needed to be very flexible, then the areas 29 of the tape(s) which would be located in those areas of the extrusion could be punched out or otherwise removed from the tape, so that those areas would not control stretching of the edge trim during or after manufacture. To assist manufacture, the tape could be attached to the remainder of the carrier by degradable thread, which could then be degraded entirely during extrusion or during curing of the product after extrusion.

Another way of achieving a carrier having different flexibility characteristics across its width (and along its length) is to knit or otherwise incorporate into the zig-zag wire or slotted, pressed or stamped metal or plastics material a plurality of warps formed of thread having different characteristics and degradability. Easily degradable threads can then be degraded at different required transverse locations along the length of the carrier, before a cover is extruded or otherwise placed around the carrier. However, less easily degradable threads can be left in the carrier until it has been incorporated into a cover (e.g. by extrusion) to assist in the extrusion (or other covering process) and the less easily degradable threads can then all be degraded subsequently (e.g. during a curing stage of the extrusion) so that the flexibility characteristics of the carrier are then dictated solely by the partly degraded easily degradable threads.

When the carrier is incorporated into a polymer extrusion and the whole is formed into an edge trim of U-shaped cross-section, e.g. with gripper fins extending inwardly from the arms of the U in known manner, the flexibility and stiffness of the carrier will vary along its length in dependence on the location of the strands 9, 11 and 13, or tapes 25, even if these are all non-degradable, or some are degradable, but not degraded. However, when the degradable strands 9, 11 or tapes 25 are degraded at selected regions along its length (in any known or other manner), this will affect the stiffness and flexibility of the carrier throughout its length (and hence of the extrusion, e.g. edge trim, in which it is located) significantly. This means that the carrier, and hence the extrusion in which it is located, can be specifically designed to cause it to bend easily in some places in one direction and easily in another direction at another place or places along its length. For example, the carrier shown in FIG. 3, when incorporated in a U-shaped edge trim and then degraded at the specific region, will be very flexible in its edge regions (the tips of the arms of the U) in the region 15, thus making it suitable in this region 15 for fitting on a concave corner flange, and very flexible in its central region in the regions 19, thus making it very suitable for fitting in the regions 19 to a convex corner flange. However, in the region 21, if it is degraded there, it will be very flexible in one arm of the U, and hence suitable for fitting to a "left" turn at this region. However, by degrading the strands 9 and 11 in the region 23, the other arm of the U would be made very flexible, thus making this region of the edge trim suitable for fitting to a "right" turn.

It will be appreciated that it is not necessary to use degradable yarns to benefit from this invention. For example, if the degradable strands 9 and were nondegradable, and the only strands in the carrier (the strands 13 being omitted), the carrier would be very flexible where there are no strands, but much stiffer where they are located.

It will also be appreciated that this invention is not limited to knitted wire carriers. They could be woven, stitched, and instead of incorporating the zig-zag wire 3, could incorporate two or more such wires, or an equivalent to wire. The wire could be replaced with welded or woven metallic or like ladder-like lattice, or expanded metal-like structure, or be replaced with what is known as slotted or stamped metal or an equivalent arrangement, with transverse spaced strips of metal or the like replacing the wire lengths 3. These metal strips may or may not be connected to each other with metal. Five such constructions will now be described with reference to FIGS. 5-7.

Figure 5A:
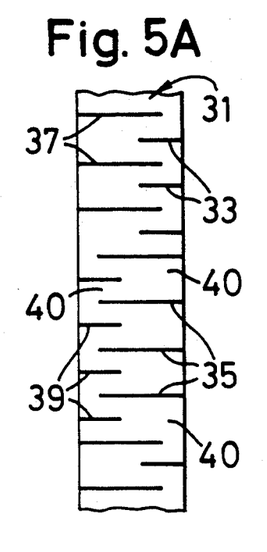
FIGS. 5A and 5B are plan views of short lengths of two different versions of slit metal carrier.
Figure 5B:
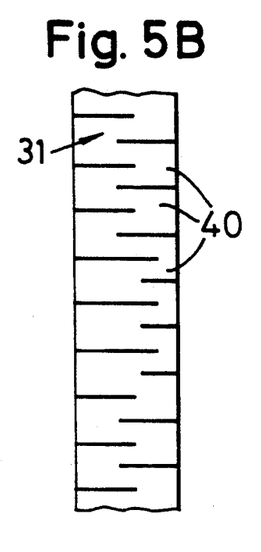

Referring to FIG. 5A, a metal (or plastic) carrier in the form of a strip of material 31 is stamped, rolled or otherwise formed with a plurality of longitudinally spaced transversely extending slits 33, 35, 37 and 39 extending into the strip from each of its longitudinal edges (although those along one edge could be omitted). As shown, the slits 33 are short and do not extend into the strip as far as its centre line, whereas the slits 35 are much longer and extend a substantial way across the strip. The slits 37 are similar to slits 35 and slits 39 are similar to slits 33, but both sets could be of different lengths. Such an arrangement is shown in FIG. 5B. In each case, the slits separate the material 31 into a plurality of transverse extending pieces of material 40 connected by means (the unseparated strip portions) extending lengthwise of the carrier.

When the carrier is used in an extruded edge trim which is of generally U-shaped construction it will have different characteristics along its length, in that the length and spacing of the slits will affect the stiffness and flexibility of the edge trim, thus allowing it to flex and hence be fitted to different shaped bends as are now found in motor vehicle door openings. In fact, the length and spacing of the slits can be designed to meet the requirements of the edge trim.

Instead of extending inwardly from one or both edges of the strip, or as well as doing this, the slits could be located in a central region of the carrier, and of varying lengths.

Figure 6A:
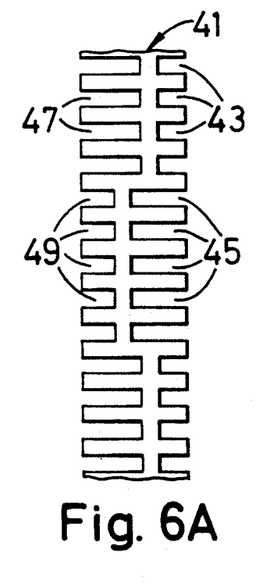
FIGS. 6A and 6B are views similar to FIGS. 5A and 5B of stamped metal carrier.

In the construction shown in FIG. 6A, a carrier in the form of an elongate strip 41 stamped or otherwise formed out of a sheet of metal or other semi-rigid material is shown. In this construction, a plurality of slots or cut-outs 43,45,47 and 49 are formed in the carrier, which have a similar function to the slits 33, 35, 37 and 39 in the previous embodiments. As with the previous embodiment, the length of the slots will affect the properties of the carrier.

Figure 6B:
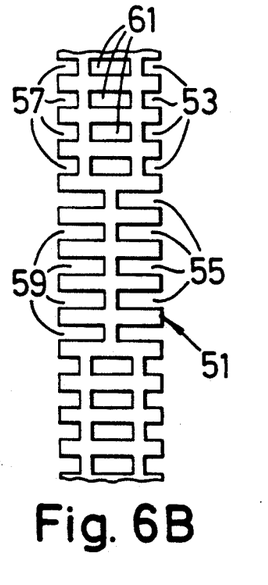

Different length slots 53, 55, 57 and 59 are shown in the embodiment of FIG. 6B, but in this embodiment the carrier 51 is also provided with a plurality of transversely extending centrally located longitudinally spaced slots 61 located between the slots 53 and 57, but spaced therefrom by short "lands" which maintain the longitudinal integrity of the carrier. The slots 53 and 57 could be omitted, which would then change the character of the carrier 51.

Figure 7:
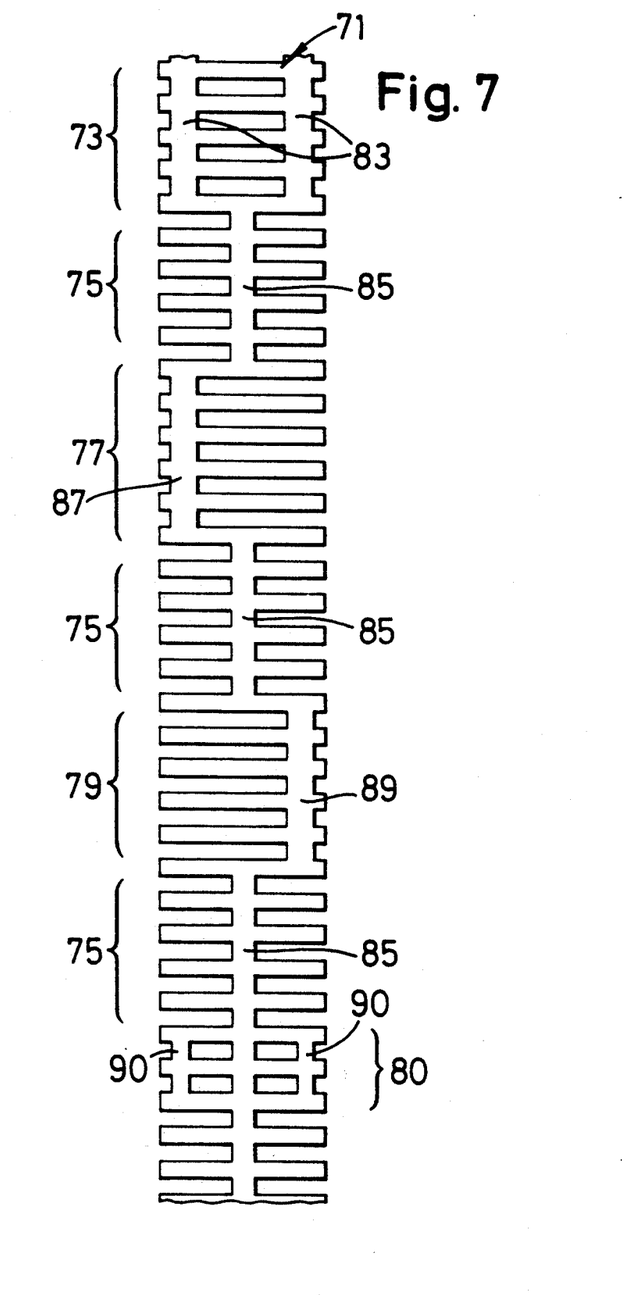
FIG. 7 is a plan view of a stamped metal carrier having similar properties to the knitted wire carrier of FIG. 3.

In the construction shown in FIG. 7, a carrier 71 formed from sheet material, e.g. slotted or stamped metal, is shown, which has similar characteristics to the knitted wire carrier of FIG. 3, assuming that in that construction the heavy strands 9 and 11 were non-degradable, and the strands 13 were not provided.

As can be seen from FIG. 7, the carrier has a plurality of transverse members of different lengths interconnected by longitudinally extending strips or lands 83 (two), 85, 87, 89, 90 (two), the transverse locations of which vary along the length of the carrier. (The lands 83 and 89 are wider than the others). This means that when the carrier is incorporated, for example, in a U-shaped carrier and coated with a polymeric material, the edge trim will have, in the region 73, a very stiff non-extendable area at the free ends of the arms of the U, whereas in the regions 75 (three) the base of the U will be very stiff and non-extendable. However, in the region 77 only one arm of the U will be very stiff and non-extendable near its free end, whereas in the region 79, the other arm of the U will have this property.

The region 80 will have properties similar to the region 73, but because the strips 90 are narrower than the strips 83, it will not be quite so stiff.

One of the reasons for incorporating some degradable warps in the wire carriers disclosed in FIGS. 1-3 or even in the construction of FIG. 4, is to control stretch, and to prevent twisting of the wire during manufacture of an extrusion incorporating the carrier. It is also possible to achieve the same degree of control in slotted metal carriers.

Figure 7A:
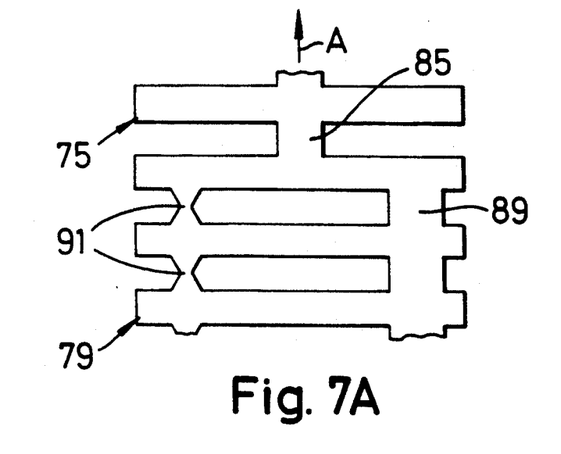
FIG. 7A is a scrap view showing a modification of part of the carrier of FIG. 7.

Referring now to FIG. 7A, this shows a modification of the regions 75 and 79 of the stamped or slotted metal or plastics carrier of FIG. 7. When the FIG. 7 carrier is subjected to tension forces, for example when the carrier is being pulled with an extruded cover out of an extruder, there is a tendency for the carrier to stretch at lateral locations spaced from the laterally offset connecting pieces 87 and 89. This would result in a twisted, i.e. non-straight, end product. This phenomenon can be prevented by providing frangible connecting straps 91 as shown in FIG. 7A. These straps 91 have reduced width control regions, and are located adjacent the edge of the strip opposite the connecting pieces 89 (or 87). This means the carrier cannot twist when subjected to tension in the direction of the arrow A. In order to give the carrier the properties of the invention, the frangible straps 91 can be broken at any time simply by twisting the carrier back and forth a few times, in known manner. This could of course be done before the carrier is covered, e.g. with an extruded polymer, but would normally be done after coating or covering.

In all the above described constructions, the carriers are particularly suited (although the invention is not so limited) to being incorporated within an extrusion of polymeric material. When these are to provide car door or door opening edge trims, the extrusion is normally cut to a predetermined length, and then formed into a ring, and supplied to the car manufacturer in this form ready for fitting. Obviously, because the extrusion will have different stiffness/rigidity/flexibility properties along its length, means should be provided, e.g. an electronic marker system, so that specific areas (e.g. modified areas) of the carrier can be located even though they have been coated with polymeric material.

In the above-described constructions, it is suggested that some of the warps made up of strands 9, 11, 13 or tapes 25, or pieces of metal such as 85, 87, 89 in the stamped metal construction shown in FIG. 7 will always remain in the carrier to control stretching. It is envisaged, however, that for certain circumstances, no warp whatsoever would be required over part(s) of the length of the carrier, thus giving considerable stretchability and flexability.

It should be noted that features of this invention incorporated in one embodiment of the invention could be incorporated in another embodiment, either as well as, or in place of the features of that other embodiment.

It will of course be understood that the present invention has been described above purely by way of example, and modifications of detail can be made within the scope of the invention. It is envisaged, for example, that degrading may be achieved using ultrasonics. This would normally be carried out prior to extrusion of a cover around the carrier. The embodiment incorporating the tapes can of course be formed by degrading the necessary sections of the tapes 25 prior to any extrusion step.

Furthermore, in the embodiments of FIGS. 5A and 5B, the degree of overlap, and length of the slits 33, 35, 37 and 39, and their spacing can be altered. Likewise, in the embodiments of FIGS. 6A, 6B and 7, the widths of the cut-outs 43, 45, 47 and 49 can be varied, as can their spacing. For example, they may not all be the same width. This in turn means that the longitudinally extending metal strips can have their location or width changed. One may for example be wider than another. These modifications would all alter the stiffness characteristics of an extrusion in which the carrier was located.

I claim:

1. An elongate carrier comprising a plurality of longitudinally separated transversely extending metal strip members and means extending lengthwise of the carrier to control the spacing of said members, wherein the transverse location in said carrier of said means is varied along the length of said carrier, the variation of the transverse location and the actual transverse location at any longitudinal position in the carrier of said means being selected to provide at least one region of increased longitudinal flexibility.

2. An elongate carrier comprising a plurality of longitudinally separated transversely extending metal strip members and means extending lengthwise of the carrier to control the spacing of said members characterized in that, in selected regions of the carrier, said means is not present, thus varying the characteristics of the carrier along its length, depending upon the required characteristics of the carrier.

3. A carrier according to claim 1 or 2 wherein said members and said means comprises different portions of a unitary metal strip and the portions comprising the means connected at least selected ones of the portions comprising the members.

4. An elongate carrier comprising a serpentine wire having a plurality of longitudinally separated transversely extending wire members and means extending lengthwise of the carrier to control the spacing of the wire members wherein the transverse location in the carrier of said means is varied along the length said carrier, the variation of the transverse location and the actual transverse location of said means at any longitudinal position in the carrier being selected to provide at least one region of increased longitudinal flexibility.

5. A carrier according to claim 1 or 2 wherein said means comprises at least one strand of material.

6. A carrier according to claim 5, wherein said means comprises a plurality of strands and wherein some of said strands extend in a straight line along the length of the carrier and others are so located that their transverse location varies along the length of the carrier.

7. A carrier according to claim 6 wherein each strand is connected to each member.

8. A wire carrier comprising at least one length of wire deformed into a zig-zag configuration thereby providing a plurality of spaced transverse lengths of wire extending across a central region of the carrier and joined by loops of wire along each edge region of the carrier, and at least one strand of material which maintains the length of wire in its zig-zag configuration, wherein the transverse location of said at least one strand of material is varied along the length of the carrier to change the longitudinal flexibility characteristics of the carrier in at least one region.

9. A carrier according to claim 8 wherein the said at least one strand is connected to each transverse length of wire by a knitted stitch.

10. A carrier according to claim 8 wherein a plurality of such strands extend along the length of the carrier and each is knitted into the zig-zag configuration and connected to each transverse length of wire.

11. A carrier according to claim 10 wherein the transverse location of selected ones of only of said strands is varied along the length of the carrier.

12. A carrier according to claim 8 wherein said at least one strand is formed of degradable material.

13. A carrier according to claim 10 wherein selected ones of the said plurality of strands are degradable.

14. A carrier according to claim 12, wherein each degradable strand extends in a straight line along the length of the carrier, and including at least one non-degradable strand; wherein one of the degradable strand the the non-degradable strand has its transverse location varied along the length of the carrier.

15. A carrier according to claim 13, wherein each degradable strand extends in a straight line along the length of the carrier, and including at least one non-degradable strand; wherein one of the degradable strand and the non-degradable strand has its transverse location varied along the length of the carrier.

16. A carrier according to claim 14 wherein both each degradable strand and each non-degradable strand have their transverse locations varied along the length of the carrier.

17. A carrier according to claim 15 wherein both each degradable strand and each non-degradable strand have their transverse locations varied along the length of the carrier.

18. A carrier formed of stamped sheet material selected from the group consisting of plastic and metal comprising a plurality of longitudinally spaced transversely extending strips of material; and further portions of the sheet material connecting said transversely extending strips wherein the transverse location of the further portions of the carrier varies along the length of the carrier, the variation of the transverse location and the actual transverse location at any longitudinal position in the carrier of said further portions being selected to provide at least one region of increased longitudinal flexibility.

19. A carrier according to claim 18 wherein the further portions of the carrier are portions thereof which are not separated by a slit or slot.

20. A carrier according to claim 18 wherein the further portions of the carrier are made up of longitudinally extending portions of the sheet material.

21. A carrier according to claim 20 wherein the width of the portions varies.

22. A carrier according to claim 21 wherein the longitudinally extending portions are disposed at an angle other than 90° with respect to the longitudinal axis of the carrier.

23. A carrier in the form of a longitudinally extending strip formed of sheet material, selected from the group consisting of plastic and metal:
wherein a plurality of transverse, longitudinally spaced slits are provided in the strip, characterised in that the length of the slits varies along the length of said strip to change the characteristics of the carrier along its length to provide at least one region of increased longitudinal flexibility.

24. A carrier according to claim 23 wherein the slits are located in a central region of the strip.

25. A carrier according to claim 24 wherein the slits extend inwardly from at least one longitudinal edge of the strip.

26. A carrier according to claim 23 wherein the slits are sufficiently wide that they form slots.

27. A carrier according to claim 23 wherein the plurality of slits of the same length are located in the strip adjacent to each other.

28. A carrier according to claim 4 wherein the means to control the spacing of the members comprises one or more lengths of tape.

29. A carrier according to claim 1, 2, or 4 wherein at selected locations within the carrier, the transversely extending members are not connected to adjacent members at all.

30. A carrier according to claim 8 wherein at selected locations within the carrier, the transversely extending members are not connected to adjacent members at all.

31. A carrier according to claim 18 or 23 wherein at selected locations within the carrier, the transversely extending members are not connected to adjacent members at all.

32. An extrusion incorporating a carrier as claimed in claims 1, 2, 8, 18, or 23.

33. An edge trim incorporating a carrier as claimed in claims 1, 2, 8, 18, or 23.

34. An elongate sealing strip incorporating a carrier as claimed in claim 1 or 2.

35. An elongate sealing strip incorporating a carrier as claimed in claim 8.

36. An elongate sealing strip incorporating a carrier as claimed in claim 18 or 23.

37. A method of manufacturing a wire carrier having a plurality of longitudinally spaced transversely extending wire members, the longitudinal spacing of which is controlled by means extending at least generally longitudinally between, and connected to, adjacent transversely extending members, the transverse location of which means varies along the length of the carrier, characterized in that the transverse location of said means, and the variation of said transverse location throughout the length of the carrier, are selected to control the characteristics of the carrier, and hence of any product within which it is incorporated, at selected longitudinal locations therein.

38. An door seal incorporating a carrier as claimed in claims 1, 2, 8, 18, or 23.

39. A method of manufacturing a sheet of a material selected from the group consisting of plastic and metal carrier having a plurality of longitudinally spaced transversely extending members, the longitudinal spacing of which is controlled by means extending at least generally longitudinally between, and connected to, adjacent transversely extending members, the transverse location of which means varies along the length of the carrier, characterized in that the transverse location of said means, and the variation of said transverse location throughout the length of the carrier, are selected to control the characteristics of the carrier, and hence of any product within which it is incorporated, at selected longitudinal locations therein.

* * * * *